United States Patent
Ryon et al.

(10) Patent No.: US 11,415,059 B2
(45) Date of Patent: Aug. 16, 2022

(54) TANGENTIALLY MOUNTED TORCH IGNITORS

(71) Applicant: Delavan Inc., West Des Moines, IA (US)

(72) Inventors: Jason Ryon, Carlisle, IA (US); Lev A. Prociw, Johnston, IA (US); Brandon Phillip Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/133,216

(22) Filed: Dec. 23, 2020

(65) Prior Publication Data

US 2022/0195939 A1 Jun. 23, 2022

(51) Int. Cl.
*F02C 7/264* (2006.01)
*F02C 7/22* (2006.01)

(52) U.S. Cl.
CPC ............... *F02C 7/264* (2013.01); *F02C 7/22* (2013.01); *F05D 2240/35* (2013.01); *F05D 2260/30* (2013.01); *F05D 2260/99* (2013.01)

(58) Field of Classification Search
CPC .......... F02C 7/264; F02C 7/266; F02C 7/286; F02C 3/04; F23R 3/045; F23R 3/16; F23R 3/343; F23R 3/14; F23R 3/20; F23R 3/28
See application file for complete search history.

(56) References Cited

U.S. PATENT DOCUMENTS

| | | |
|---|---|---|
| 2,645,082 A | 7/1953 | Sarto |
| 2,929,210 A | 3/1960 | Howes |
| 3,691,766 A * | 9/1972 | Champion ............... F02C 7/264 60/39.826 |
| 3,954,389 A | 5/1976 | Szetela |
| 4,112,675 A | 9/1978 | Pillsbury et al. |
| 4,192,139 A | 3/1980 | Buchheim |
| 4,194,358 A | 3/1980 | Stenger |

(Continued)

FOREIGN PATENT DOCUMENTS

FR 3080672 A1 11/2019

OTHER PUBLICATIONS

Extended European Search Report dated May 17, 2022, issued during the prosecution of European Patent Application No. EP21216573.2.

*Primary Examiner* — Craig Kim
(74) *Attorney, Agent, or Firm* — Locke Lord LLP; Joshua L. Jones; Scott D. Wofsy

(57) ABSTRACT

A torch ignitor system for a combustor of a gas turbine engine includes a torch ignitor, the torch ignitor including a combustion chamber oriented about a torch axis, the combustion chamber having axially upstream and downstream ends defining a flow direction through the combustion chamber, along the axis. The torch ignitor includes a cap defining the axially upstream end of the combustion chamber and oriented about the axis, wherein the cap is configured to receive a fuel injector and at least one glow plug. The torch ignitor includes an elbow connected to the downstream end of the combustion chamber for diverting combustion products along an ignition jet flame axis that is off of the torch axis for injection of combustion products into a gas turbine engine combustor. The torch ignitor further includes a tip at a downstream end of the elbow for issuing the injection of combustion products.

18 Claims, 6 Drawing Sheets

(56) References Cited

U.S. PATENT DOCUMENTS

| | | | |
|---|---|---|---|
| 4,860,533 A | 8/1989 | Joshi | |
| 5,027,603 A * | 7/1991 | Shekleton | F02C 7/26 |
| | | | 60/743 |
| 6,912,857 B2 * | 7/2005 | Schmotolocha | F23Q 13/00 |
| | | | 431/263 |
| 8,863,495 B2 | 10/2014 | Ikeda | |
| 2004/0168442 A1 | 9/2004 | Schmotolocha et al. | |
| 2004/0226298 A1 * | 11/2004 | Snyder | F02K 3/10 |
| | | | 60/761 |
| 2005/0053876 A1 | 3/2005 | Joos et al. | |
| 2007/0107437 A1 * | 5/2007 | Evulet | F23R 3/286 |
| | | | 60/776 |
| 2014/0366551 A1 * | 12/2014 | Prociw | F23R 3/28 |
| | | | 60/776 |
| 2018/0003388 A1 | 1/2018 | Park | |
| 2019/0010872 A1 * | 1/2019 | Dam | F23R 3/34 |
| 2019/0017441 A1 | 1/2019 | Venkatesan et al. | |
| 2020/0309378 A1 * | 10/2020 | Dam | F23R 3/14 |
| 2021/0215100 A1 | 7/2021 | Head et al. | |

\* cited by examiner

TANGENTIALLY MOUNTED TORCH IGNITORS

BACKGROUND

The present disclosure relates to gas turbine engines and, more particularly, to in torch ignitors used in the combustor section of a gas turbine engine.

Torch ignitors can be used in lieu of spark ignitors to provide an ignition source for combustors located in gas turbine engines. Torch ignitors provide a flame to the combustion chamber of a gas turbine engine as an ignition source rather than the electric current provided by spark ignitors. Consequently, torch ignitors can provide a larger target for fuel injectors within the combustor, allowing for utilization of a greater range of fuel injector designs. Torch ignitors are intended to remain active while the gas turbine is operating. Due to their position, torch ignitor components can often be difficult to reach for routine maintenance or replacement. There remains a need for torch ignitors with reduced axial length within the high pressure engine case therefore allowing for line replacement of some components within the system.

SUMMARY

A torch ignitor system for a combustor of a gas turbine engine includes a torch ignitor, the torch ignitor including a combustion chamber oriented about a torch axis, the combustion chamber having axially upstream and downstream ends defining a flow direction through the combustion chamber, along the axis. The torch ignitor also includes a cap defining the axially upstream end of the combustion chamber and oriented about the axis, wherein the cap is configured to receive a fuel injector and at least one glow plug. The torch ignitor includes an elbow connected to the downstream end of the combustion chamber for diverting combustion products along an ignition jet flame axis that is off of the torch axis for injection of combustion products into a gas turbine engine combustor. The torch ignitor further includes a tip at a downstream end of the elbow for issuing the injection of combustion products.

DETAILED DESCRIPTION

The present disclosure presents structures and methods for starting a torch ignitor suitable for igniting the main combustor of a gas turbine engine.

The following are non-exclusive descriptions of possible embodiments of the present disclosure. A small, independent torch ignitor system offers many advantages for gas turbine engines, for example, an independent heat source from the main combustor which can be used to ignite, stabilize, and relight the main combustor. The isolated nature of such a system allows the torch ignitor to be stable regardless of the conditions within the main combustor.

Figure 1:
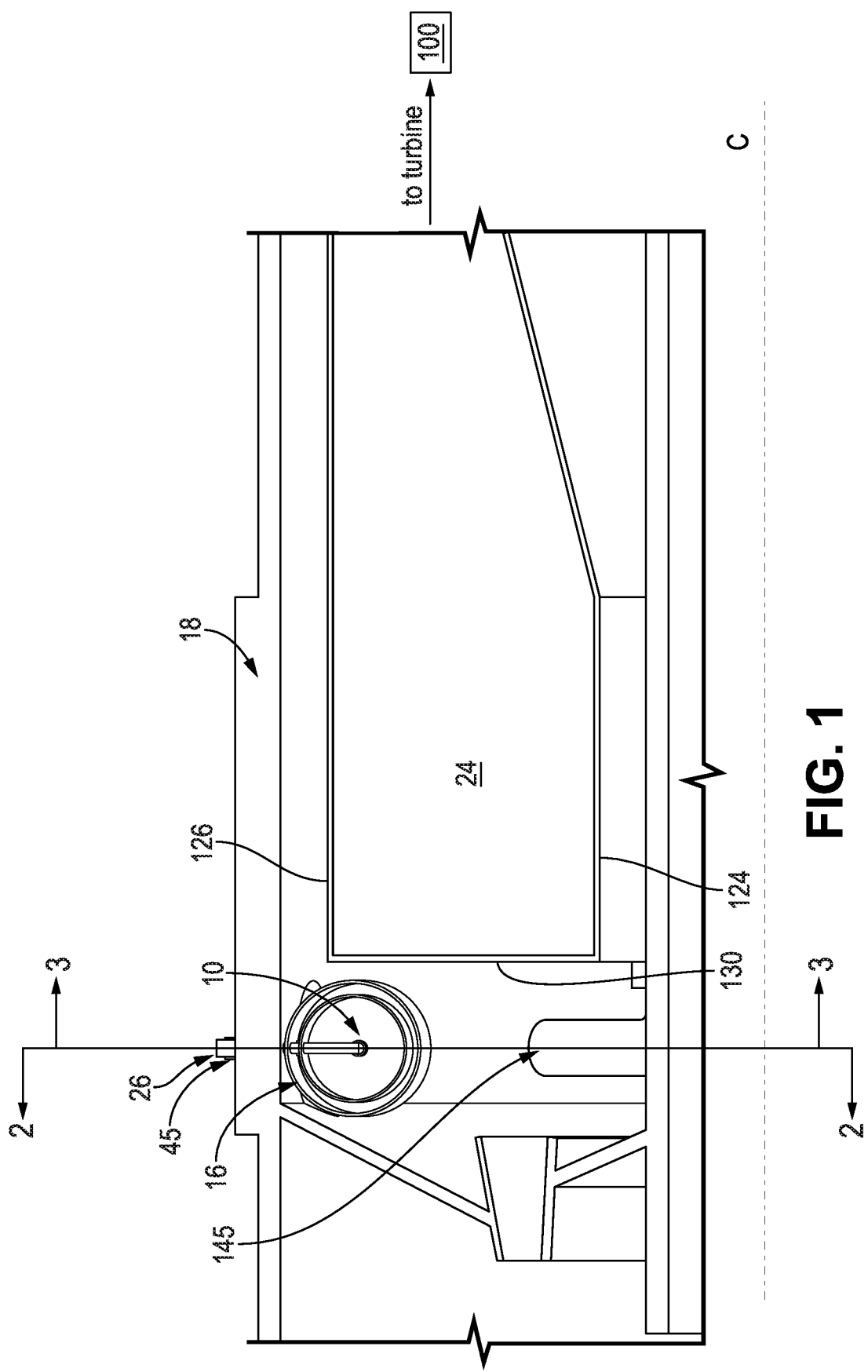
FIG. 1 is a cross-sectional side elevation view of a forward mounted torch ignitor within the combustion section of a gas turbine engine.
Figure 2:
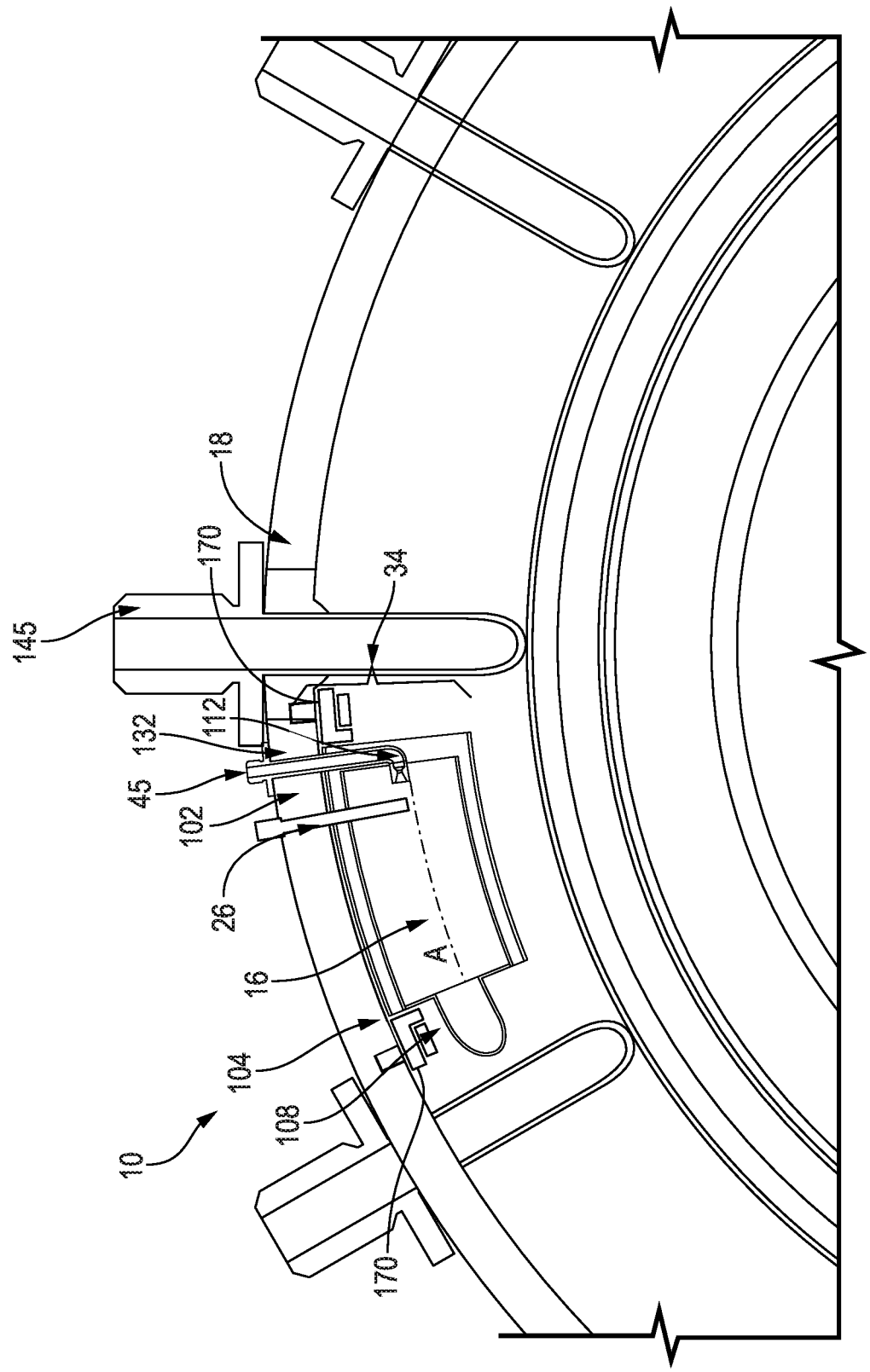
FIG. 2 is a cross-sectional axial view looking in an upstream direction of the forward mounted torch ignitor of FIG. 1.
Figure 3:
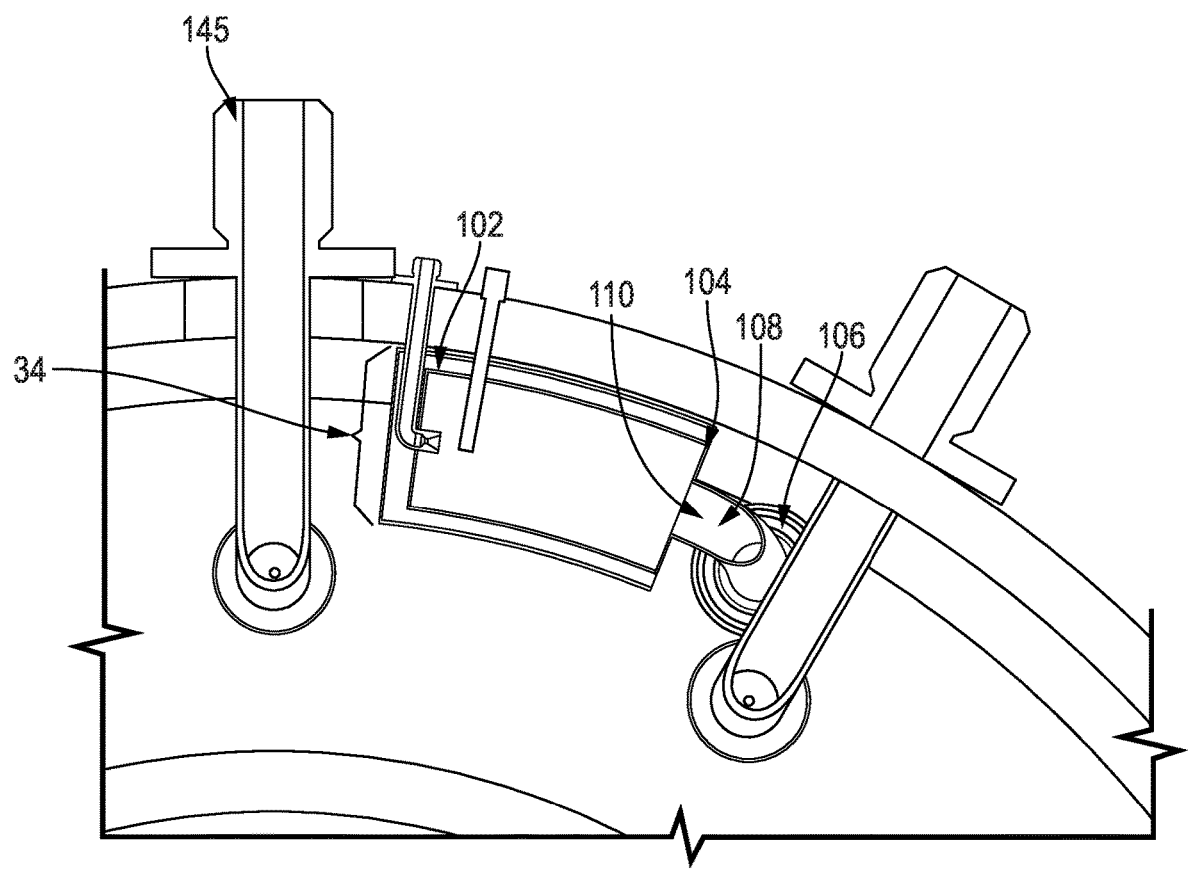
FIG. 3 is a cross-sectional axial view looking in downstream direction of the forward mounted torch ignitor of FIG. 1.
Figure 6:
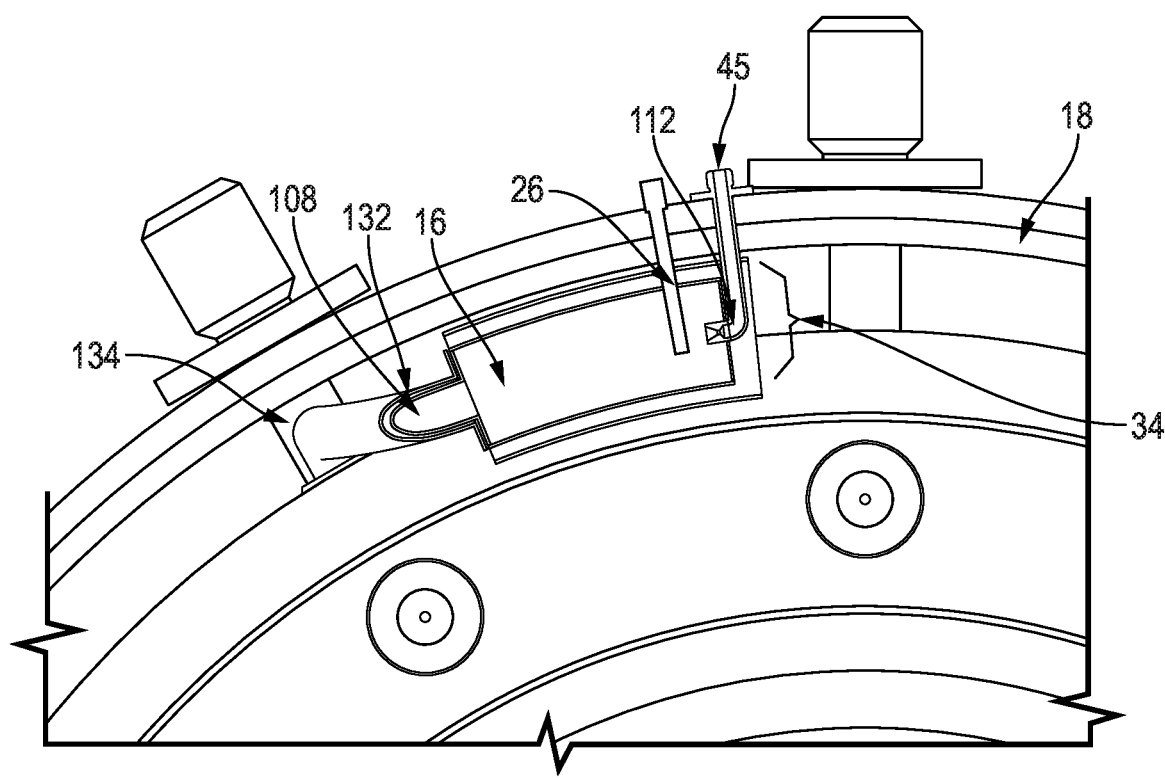
FIG. 6 is a cross-sectional axial view looking in an upstream direction of the aft mounted torch ignitor of FIG. 5.

FIG. 1 is a cross sectional view of a torch ignitor 10 for a main combustor 24 of a gas turbine engine 100. The torch ignitor 10 can comprise a combustion chamber 16 oriented about a torch axis A (axis shown in FIG. 2), and the combustion chamber 16 can have axially upstream and downstream ends 102, 104 defining a flow direction through the combustion chamber 16, along the axis A (e.g. as also shown in FIG. 2). Because in FIG. 1 the torch ignitor 10 is oriented tangent to an engine axis C, only the downstream end 104 of the combustion chamber 16 is visible. Though torch ignitor 10 is oriented mainly tangential to the engine axis C, some components of the torch ignitor 10 may be radial or axial components, for example if the main combustor 24 is canted outwards, the torch ignitor 10 may be positioned to fit best, and may not necessarily be tangential to the engine access C. Additionally, the torch ignitor 10 may be positioned as to best fit the needs of the main combustor 24, for example to optimize ignition, relight, emissions, acoustic control and the like. A cap 34 can define the axially upstream end 102 of the combustion chamber 16 and can also be oriented about the axis A (e.g. as shown in FIGS. 2-3 and 6). The cap 34 may be separable from the torch wall 16, or may be formed integrally with the torch wall 16. In the example shown in FIG. 1, the cap 34 can be configured to receive a fuel injector 45 and at least one glow plug 26.

Figure 4:
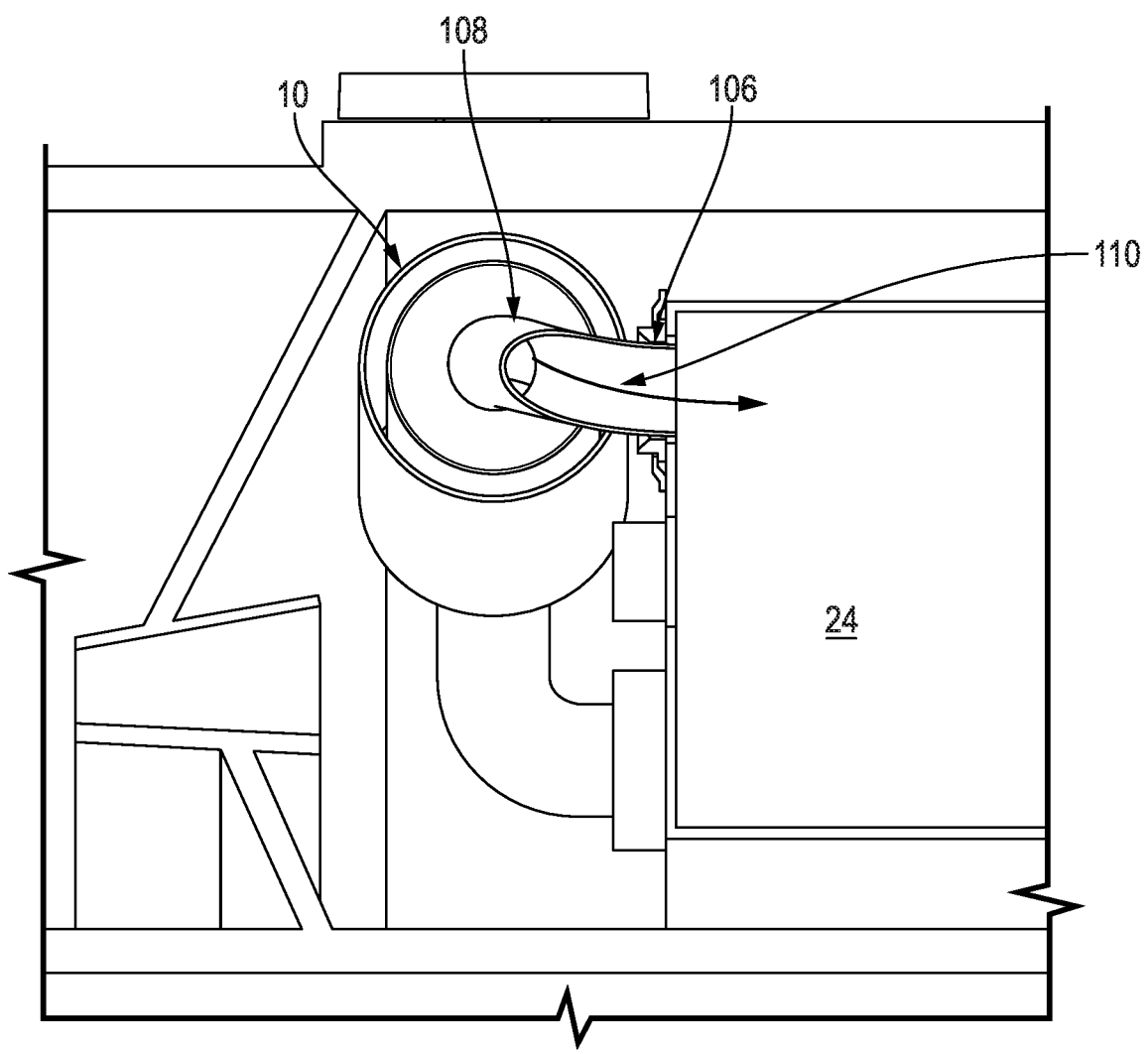
FIG. 4 is a cross-sectional side elevation view of the forward mounted torch ignitor of FIG. 1
Figure 5:
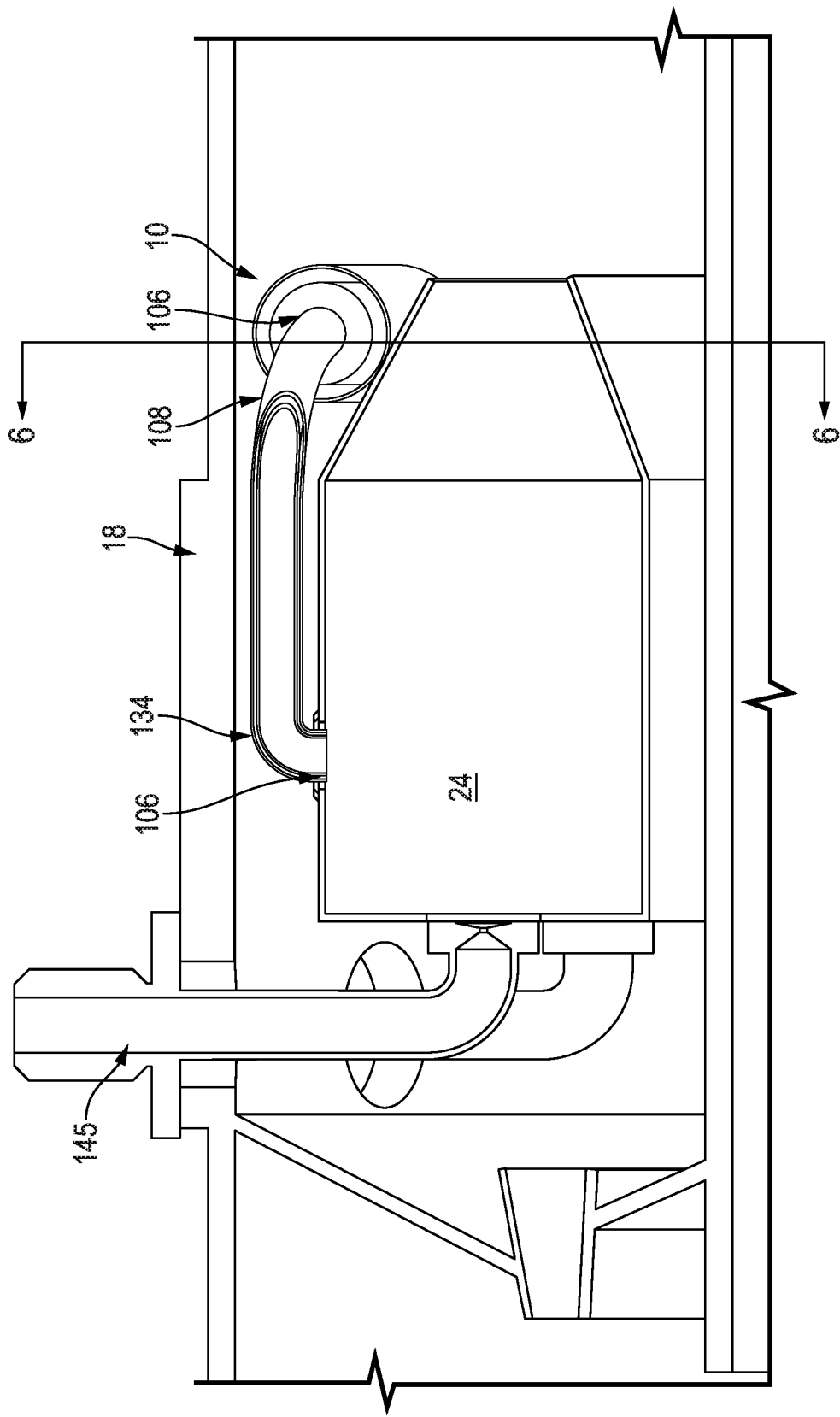
FIG. 5. is a cross-sectional side elevation view of an aft mounted torch ignitor within the combustion section of a gas turbine engine.

The torch ignitor 10 can include an elbow 108 connected to the downstream end 104 of the combustion chamber 16 for diverting combustion products (e.g. flame) along an ignition jet flame axis B (e.g. as shown in FIGS. 4 and 5). Ignition jet flame axis B can be off of the torch axis A for injection of flame into a gas turbine engine main combustor 24. It is possible that the injection may be axial as shown, or may be radial or tangential relative to the main combustor 24 (e.g. engine axis C), or any combination or axial, radial, or tangential. The torch ignitor 10 can also include a tip 106 at a downstream end of the elbow for issuing the injection of flame (e.g. as shown in FIGS. 4 and 5). By including an elbow 108 on torch ignitor 10, the tip 106 of the torch ignitor 10 can be independent of the axis of the combustion chamber 16 of the torch 10, e.g. axis A. This configuration can provide added flexibility as to placement of torch ignitor 10 and its components (e.g., combustion chamber 16), relative to the location and angle of the torch flame 110 that enters into the main combustor 24. As shown in FIGS. 3-4, the tip 106 can be oriented to outlet from the combustion chamber 16 in a radial direction relative to the torch axis A, for example along the arrow 110.

The cap 34 may be mounted to a high pressure engine case 18 while the tip 106 may be mounted to a main combustor 24 within the high pressure engine case 18. In this way, it is possible for the main combustor 24 to be in fluid communication with fuel and pressurized oxygen containing gas from sources outside the high pressure engine case 18 when flowing into the main combustor 24.

In embodiments, such as the example shown in FIG. 2, the torch ignitor 10 can include a fuel injector seat 112 defined in the cap 34. The fuel injector seat 112 can be configured to receive the fuel injector 45 and to provide a passage for injecting fuel and air from an external source through the fuel injector 45 and into the combustion chamber 16. It is also possible that the torch ignitor 10 can include at least one glow plug seat 50 defined in the cap 34. The glow plug seat 50 can be comprised of multiple components, such as a housing and sheath, however for the sake of simplicity, the structure will be hereinafter referred to as the glow plug seat 50. The glow plug seat 50 can be configured to receive the glow plug 26 through the cap 34 where the glow plug 26 can extend through the cap 34 and into the combustion chamber 16 to initiate ignition in fuel and air in the combustion chamber 16.

In embodiments, the main combustor 24 can include a high pressure engine case 18, where the cap 34 can be mounted to an opening 132 through the high pressure engine case 18 (e.g. by fuel injector 45). Additionally, or alternatively, the torch ignitor 10 itself may be mounted to the high pressure engine case 18, such as shown in FIG. 2. It is possible that the torch ignitor 10 and cap 34 are both mounted to the high pressure engine case 18 by support bracket 170 for example, however any suitable attaching means may be used.

The combustion chamber 16 can be oriented tangential to an engine axis C, while, as described above, the torch can be defined along axis A. The torch axis A and engine axis C can be non-intersecting. The tip 106 can be mounted to the main combustor 24 to discharge flame into the main combustor 24, e.g. along arrow 110, for ignition of a fuel/air mixture in the main combustor 24. In operation, the combustion products produced in the combustion chamber 16 can then flow into the gas turbine main combustor 24, and eventually used to start the turbine, as indicated by the "to turbine" arrow in FIG. 1.

As shown, torch ignitor 10 contains its own fuel injector 45, while main combustor 24 may have plurality of main fuel injectors 145 which can be mounted to the main combustor 24. It is contemplated that for each torch ignitor 10, the combustion chamber 16 can be outside of the main combustor 24, such as shown in FIGS. 1 and 4-5.

As shown, the main combustor 24 can be annular and can include an inner wall 124 and an outer wall 126 spaced radially apart from one another. A combustor dome wall 130 can join the inner and outer walls 124,126 of the main combustor 24, such that the main fuel injectors 145 can be mounted to the combustor dome wall 130. In embodiments such as the example shown in FIGS. 1-4, the combustion chamber 16 can be positioned forward of the combustor dome wall 130 such that the torch axis A is oriented circumferentially relative to the engine axis C and so that the elbow 108 turns from the torch axis A to an aft facing direction (e.g. as shown in FIGS. 3-4). In this configuration, the tip 106 of the torch ignitor can be mounted to the combustor dome wall 130 (e.g. as shown in FIG. 4). None of the fuel injectors 145 includes a combustion chamber outside of the main combustor 24.

In embodiments, such as the example shown in FIGS. 5-6, the combustion chamber 16 can be positioned aft of the combustor dome wall 130, where the combustion chamber 16 can be positioned radially outward of a portion of the outer wall 134, but can still be within the high pressure engine case 18. In this configuration, the torch axis A can still be oriented circumferentially relative to the engine axis C, but the tip 106 can be mounted to the outer wall 126, rather than the combustor dome wall 130. Here, the elbow 108 can include a first turn 134 from the torch axis A to a forward extending direction (e.g. towards main fuel injector 145), and a second turn 134 from the forward extending direction to a radially inward facing direction (e.g. towards the outer wall 126 of the main combustor 24).

Discussion of Possible Embodiments

The following are non-exclusive descriptions of possible embodiments of the present disclosure.

An embodiment of a torch ignitor system for a combustor of a gas turbine engine includes a torch ignitor, the torch ignitor including a combustion chamber oriented about a torch axis, the combustion chamber having axially upstream and downstream ends defining a flow direction through the combustion chamber, along the axis. The torch ignitor includes a cap defining the axially upstream end of the combustion chamber and oriented about the axis, wherein the cap is configured to receive a fuel injector and at least one glow plug. The torch ignitor includes an elbow connected to the downstream end of the combustion chamber for diverting combustion products along an ignition jet flame axis that is off of the torch axis for injection of combustion products into a gas turbine engine combustor. The torch ignitor further includes a tip at a downstream end of the elbow for issuing the injection of combustion products.

The system of the preceding paragraph can optionally include, additionally and/or alternatively, any one or more of the following features, configurations and/or additional components:

A further embodiment of the foregoing system, wherein the cap is mounted to a high pressure engine case and the tip is mounted to a main combustor within the high pressure engine case for fluid communication of fuel and air from sources outside the high pressure engine case into the main combustor.

A further embodiment of any of the foregoing systems can further include a fuel injector seat defined in the cap configured to receive a fuel injector and provide passage for injecting fuel and air from an external source through the injector into the combustion chamber, wherein the fuel injector extends into the cap along a radial direction relative to the torch axis, and at least one glow plug seat defined in the cap configured to receive a respective glow plug of the at least one glow plug through the cap and into the combustion chamber for initiating ignition in fuel and air in the combustion chamber, wherein the glow plug extends into the cap along a radial direction relative to the torch axis.

A further embodiment of any of the foregoing systems, wherein the tip is oriented to outlet from the combustion chamber in a radial direction relative to the torch axis.

A further embodiment of any of the foregoing systems can further include a high pressure engine case, wherein the cap is mounted to an opening through the high pressure case, and a main combustor for generation of combustion products for gas turbine power, wherein the main combustor is defined about an engine axis, wherein the torch axis and engine axis are non-intersecting, wherein the tip is configured to discharge combustion products into the main combustor.

A further embodiment of any of the foregoing systems can further include a plurality of main fuel injectors mounted to the main combustor, wherein the torch combustion chamber is outside of the main combustor, and wherein none of the main fuel injectors includes a combustion chamber outside of the main combustor.

A further embodiment of any of the foregoing systems, wherein the main combustor is annular and includes an inner wall and an outer wall spaced radially apart from one another, and wherein a combustor dome wall connects between the inner and outer walls, wherein the fuel injectors are mounted to the combustor dome wall.

A further embodiment of any of the foregoing systems, wherein the combustion chamber is positioned forward of the combustor dome wall and wherein the torch axis is oriented circumferentially relative to the engine axis.

A further embodiment of any of the foregoing systems, wherein the elbow turns from the torch axis to an aft facing direction.

A further embodiment of any of the foregoing systems, wherein the tip is mounted to the combustor dome wall.

A further embodiment of any of the foregoing systems, wherein the combustion chamber is positioned aft of the combustor dome wall and wherein the torch axis is oriented circumferentially relative to the engine axis.

A further embodiment of any of the foregoing systems, wherein the tip is mounted to the outer wall.

A further embodiment of any of the foregoing systems, wherein the elbow includes a first turn from the torch axis to a forward extending direction, and a second turn from the forward extending direction to a radially inward facing direction.

A further embodiment of any of the foregoing systems, wherein the combustion chamber is positioned radially outward of a portion of the outer wall.

A further embodiment of any of the foregoing systems, wherein the combustion chamber is inside the high pressure engine case but outside the main combustor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A torch ignitor system for a combustor of a gas turbine engine comprising:
   a torch ignitor comprising:
      a combustion chamber oriented about a torch axis, the combustion chamber having axially upstream and downstream ends defining a flow direction through the combustion chamber, along the axis;
      a cap defining the axially upstream end of the combustion chamber and oriented about the axis, wherein the cap is configured to receive a fuel injector and at least one glow plug;
      an elbow connected to the downstream end of the combustion chamber for diverting combustion products along an ignition jet flame axis into a gas turbine engine combustor;
      a tip at a downstream end of the elbow for issuing the injection of combustion products; and
   a main combustor for generation of combustion products for gas turbine power, wherein the main combustor is defined about an engine axis, wherein the torch axis is oriented circumferentially relative to the engine axis.

2. The torch ignitor system as recited in claim 1, wherein the ignition jet flame axis is off of the torch axis for tangential injection of combustion products relative to the engine axis.

3. The torch ignitor system as recited in claim 1, wherein the ignition jet flame axis is off of the torch axis for radial injection of combustion products relative to the engine axis.

4. The torch ignitor system as recited in claim 1, wherein the ignition jet flame axis is off of the torch axis for axial injection of combustion products relative to the engine axis.

5. The torch ignitor system as recited in claim 1, wherein the cap is mounted to a high pressure engine case and the tip is mounted to the main combustor within the high pressure engine case for fluid communication of fuel and air from sources outside the high pressure engine case into the main combustor.

6. The torch ignitor system as recited in claim 1, further comprising:
   a fuel injector seat defined in the cap configured to receive a fuel injector and provide passage for injecting fuel and air from an external source through the injector into the combustion chamber, wherein the fuel injector extends into the cap along a radial direction relative to the torch axis; and
   at least one glow plug seat defined in the cap configured to receive a respective glow plug of the at least one glow plug through the cap and into the combustion chamber for initiating ignition in fuel and air in the combustion chamber, wherein the glow plug extends into the cap along a radial direction relative to the torch axis.

7. The torch ignitor system as recited in claim 1, wherein the tip is oriented to outlet from the combustion chamber in a radial direction relative to the torch axis.

8. The torch ignitor system as recited in claim 1, further comprising:
   a high pressure engine case, wherein the cap is mounted to an opening through the high pressure engine case;
   wherein the torch axis and engine axis are non-intersecting, and wherein the tip is mounted to the main combustor to discharge combustion products into the main combustor.

9. The torch ignitor system as recited in claim 8, further comprising a plurality of main fuel injectors mounted to the main combustor, wherein the torch combustion chamber is outside of the main combustor, and wherein none of the main fuel injectors includes a combustion chamber outside of the main combustor.

10. The torch ignitor system as recited in claim 9, wherein the main combustor is annular and includes an inner wall and an outer wall spaced radially apart from one another, and wherein a combustor dome wall joins the inner and outer walls, wherein the main fuel injectors are mounted to the combustor dome wall.

11. The torch ignitor system as recited in claim 10, wherein the combustion chamber is positioned forward of the combustor dome wall.

12. The torch ignitor system as recited in claim 11, wherein the elbow turns from the torch axis to an aft facing direction.

13. The torch ignitor system as recited in claim 11, wherein the tip is mounted to the combustor dome wall.

14. The torch ignitor system as recited in claim 10, wherein the combustion chamber is positioned aft of the combustor dome wall.

15. The torch ignitor system as recited in claim 14, wherein the tip is mounted to the outer wall.

16. The torch ignitor system as recited in claim 15, wherein the elbow includes a first turn from the torch axis to a forward extending direction, and a second turn from the forward extending direction to a radially inward facing direction.

17. The torch ignitor system as recited in claim 15, wherein the combustion chamber is positioned radially outward of a portion of the outer wall.

18. The torch ignitor system as recited in claim 8, wherein the combustion chamber is inside the high pressure engine case but outside the main combustor.

\* \* \* \* \*